June 30, 1925.
L. B. GREEN
DUSTING APPARATUS
Filed Sept. 8, 1923
1,543,915
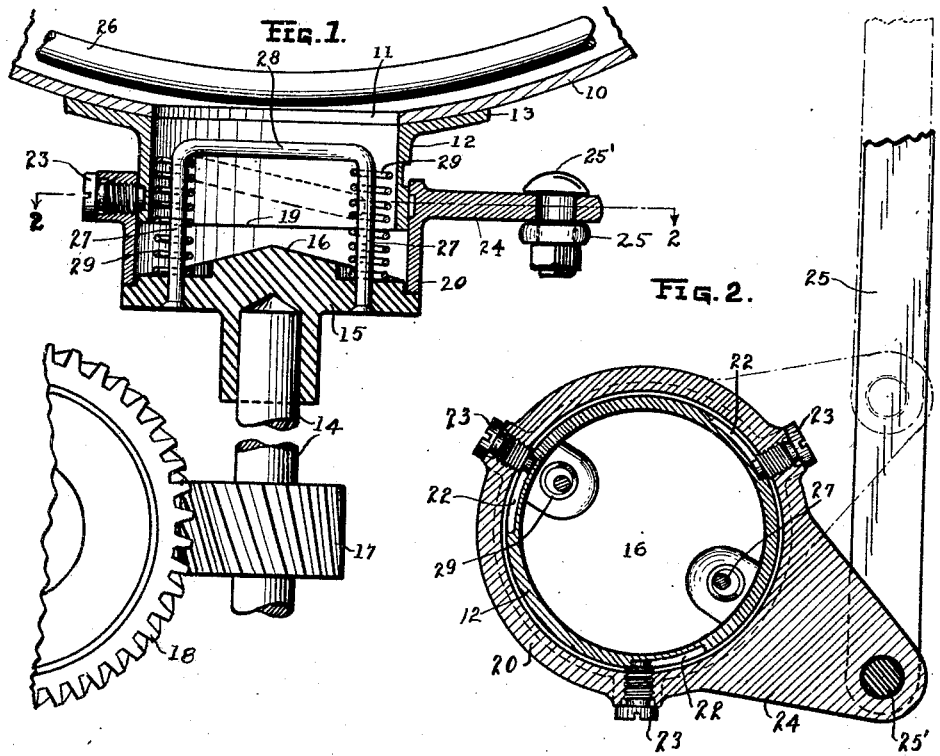
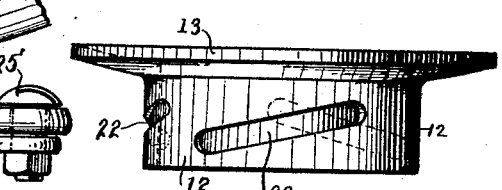
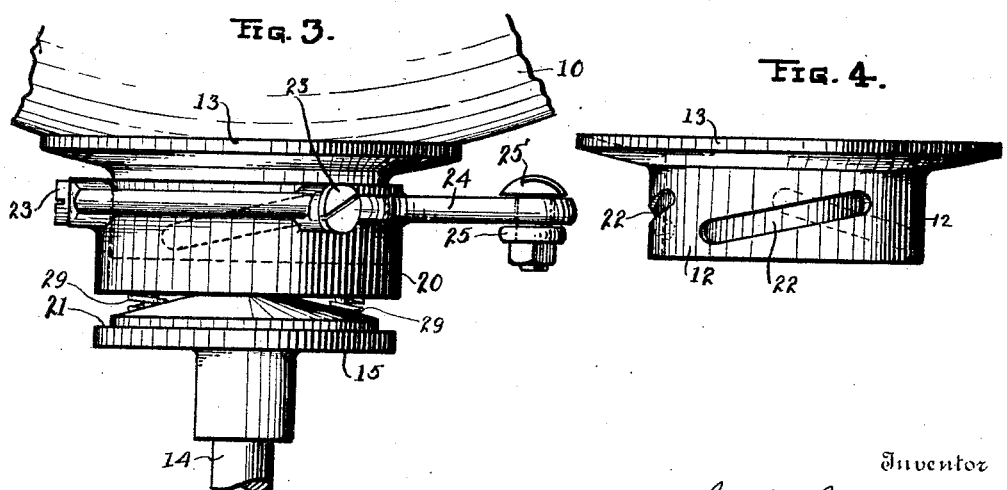
Inventor
Lee B. Green
By
Attorney Patented June 30, 1925.

1,543,915

UNITED STATES PATENT OFFICE.

LEE B. GREEN, OF LAKEWOOD, OHIO, ASSIGNOR TO THE GLOBE MACHINE AND STAMPING COMPANY, OF CLEVELAND, OHIO, A CORPORATION OF OHIO.

DUSTING APPARATUS.

Application filed September 8, 1923. Serial No. 661,584.

*To all whom it may concern:*

Be it known that I, LEE B. GREEN, a citizen of the United States, and a resident of Lakewood, county of Cuyahoga, State of Ohio, have invented certain new and useful Improvements in Dusting Apparatus, of which the following is a specification.

This invention relates to apparatus for spraying vegetation with insecticides and more particularly to that type of apparatus commonly known as a dusting machine for spraying a dry powder, although some of the features of the invention are adapted for more general use.

It is one of the objects of the invention to provide an improved form of valve and feeding mechanism for supplying powdered insecticide at the proper rate and in a finely divided condition.

A further object of the invention is to provide a valve and feeding mechanism that will be comparatively simple in construction, efficient in operation and durable.

Other objects and the features of novelty will be apparent from the following description, taken in connection with the accompanying drawings, of which:

Figure 1 is a vertical section through an apparatus embodying my invention;

Fig. 2 is a transverse section on the line 2—2 of Fig. 1;

Fig. 3 is a side elevation of the parts appearing in Fig. 1, but shown in another relation; and Fig. 4 is a side elevation of one of the parts.

Referring to the drawings, 10 indicates the bottom of a container for the insecticide material. This bottom is provided with an outlet opening 11 in cooperation with which there is the tubular member 12 having a flange 13 that is secured to the bottom 10 by rivets or soldering or in any other suitable manner.

A vertical shaft 14 carries, at its upper end, a head or disc-like member 15 which has, preferably, a conical upper surface 16. The shaft 14 is rotated at relatively high speed in any suitable manner as by means of the gears 17 and 18.

A specific application of the apparatus herein referred to is shown in my co-pending application No. 661,585 filed September 8, 1923, which relates to a complete dusting apparatus, and the gearing 17, 18, illustrates the method by which the shaft 14 (or its equivalent) is rotated in said apparatus.

The shaft 14 is preferably arranged in axial alignment with the opening 11 and attachment 12, and the member 15 is spaced from the lower edge 19 of the attachment to provide an annular discharge opening for the material. As will be readily understood the rotation of the member 15 causes the material to be thrown out, by centrifugal force. In order to regulate the flow of the material I provide a sleeve valve 20, on the exterior of the attachment 12, and the lower edge of this sleeve valve cooperates with the peripheral portion of the member 15 to regulate the size of the opening through which the material may be discharged. If desired a groove 21 may be provided in the upper surface of the member 15 to receive the lower end of the sleeve 20 for the purpose of entirely closing the space through which the material is discharged.

The outer surface of the attachment 12 is provided with one or more spirally arranged cam slots 22 and in the form of the invention illustrated I have shown three of these slots but it will be understood that any desired number, from one up, may be used. The sleeve 20 carries radially arranged screws 23, the inner ends of which cooperate with the slots 22 and thus connect the sleeve 20 to the attachment 12 and provide means whereby, when the sleeve is turned on the attachment 12, there will always be an axial movement to or from the member 15. The sleeve 20 has an arm 24 thereon to which an actuating rod 25 may be attached by a bolt 25' for the purpose of turning or rotating the sleeve on the attachment 12.

The container, of which 10 indicates the bottom wall, will usually be provided with some form of agitator and I have indicated at 26 a portion of the agitator employed in the form of dusting apparatus disclosed in my aforesaid application.

It is also desirable to have suitable means for agitating the material in the attachment 12 and to break up any lumps that may exist and, for this purpose, I have provided, on the member 15, what amounts to two pins 27, which project upwardly into the opening in the attachment 12. As a preferred construction I form the pins 27 from a single piece of rod bent into a U-shape which gives a connection 28 between the upper ends of the pins and greatly stiffens them. Arranged on the pins 27 are members 29 which rotate on the pins and run in close proximity to the inner surface of the attachment 12 and thus cooperate with the latter to break up any lumps that may exist in the material. I prefer to form the members 29 from wire wound like a helical spring, this arrangement giving flexibility to the members and also making a very effective device for breaking up the lumps. It will be understood that the rotation of the member 15, at high speed, causes the members 29, which are loose on the pins 27, to be thrown out by centrifugal force and thus operate efficiently in the breaking up of lumps of material.

When the mechanism is in operation the material will be supported by the member 15 and the rotation of the latter will cause the material to be thrown out under the lower edge of the sleeve 20 when the latter is slightly spaced from the member 15. The U-shaped member comprising the pins 27 and the cross-connection 28 will thoroughly agitate the material and, in cooperation with the members 29, will keep the material thoroughly broken up and in condition to flow. The rate of feeding may be accurately controlled by turning the sleeve 20 from the fully open position shown in Fig. 3 to the closed position shown in Fig. 1.

Having thus described my invention, what I claim is:

1. In apparatus of the class described, the combination of a container having a discharge opening, a rotary member opposed to said opening and spaced therefrom to provide an annular opening through which the material may be discharged, a pin carried by said member and projecting into said discharge opening, and a member loosely arranged on said pin and rotatable thereon to agitate and break up the material in said discharge opening.

2. In apparatus of the class described, the combination of a container having a discharge opening, a rotary member opposed to said opening and spaced therefrom to provide an annular opening through which the material may be discharged, a plurality of pins carried by said member and projecting into said discharge opening, and members loosely arranged on said pins and rotatable thereon to agitate and break up the material in said discharge opening.

3. In apparatus of the class described, the combination of a container having a discharge opening, a rotary member opposed to said opening and spaced therefrom to provide an annular opening through which the material may be discharged, a pin carried by said member and projecting into said discharge opening, and a substantially helical wire coil loosely arranged on said pin and adapted to run around the interior of said discharge opening to agitate and break up the material therein.

4. In apparatus of the class described, the combination of a container having a discharge opening, a rotary member opposed to said opening and spaced therefrom to provide an annular opening through which the material may be discharged, an inverted U-shaped member carried by said rotary member and projecting into said discharge opening, and substantially helical wire coils loosely arranged on said U-shaped member and adapted to run around the interior of said discharge opening to agitate and break up the material therein.

5. In apparatus of the class described, the combination of a container having a tubular outlet attachment in the bottom, a rotary member in axial alignment with said outlet and spaced therefrom to provide an annular discharge opening, a sleeve surrounding said attachment and movable to and from said member to vary the size of said annular opening, and means carried by said member and rotatable thereon within said attachment to agitate and break up the material.

6. In apparatus of the class described, the combination of a container having a tubular outlet attachment in the bottom, a rotary member in axial alignment with said outlet and spaced therefrom to provide an annular discharge opening, a sleeve rotatable on said attachment, cam means connecting said sleeve and said attachment adapted to cause the sleeve to move to or from said member when rotated on said attachment, and means carried by said member and rotatable thereon arranged to run around the interior of said attachment to agitate and break up the material.

In testimony whereof I affix my signature.

LEE B. GREEN.